(12) United States Patent
Shirk et al.

(10) Patent No.: US 7,255,914 B2
(45) Date of Patent: Aug. 14, 2007

(54) VARIABLE REFRACTIVE INDEX POLYMER MATERIALS

(75) Inventors: James S Shirk, Alexandria, VA (US); Eric Baer, Cleveland Heights, OH (US); P. Anne Hiltner, Cleveland, OH (US)

(73) Assignee: Case Western Reserve University, Cleveland, OH (US)

( * ) Notice: Subject to any disclaimer, the term of this patent is extended or adjusted under 35 U.S.C. 154(b) by 322 days.

(21) Appl. No.: 10/788,480

(22) Filed: Mar. 1, 2004

(65) Prior Publication Data

US 2004/0219364 A1   Nov. 4, 2004

Related U.S. Application Data

(60) Provisional application No. 60/466,058, filed on Apr. 29, 2003.

(51) Int. Cl.
*B32B 33/00* (2006.01)
*B32B 7/02* (2006.01)
*B32B 9/04* (2006.01)
*D01D 10/00* (2006.01)

(52) U.S. Cl. .................. 428/212; 428/411.1; 428/213; 428/214; 428/354; 428/492; 428/500; 359/487; 359/494; 359/582; 359/586; 264/173.1; 264/173.11; 264/173.12

(58) Field of Classification Search ............. 428/411.1, 428/212, 220, 213, 214, 354, 492, 500; 359/487, 359/494, 582, 586; 264/173.1, 173.11, 173.12
See application file for complete search history.

(56) References Cited

U.S. PATENT DOCUMENTS

| 4,540,623 | A | * | 9/1985 | Im et al. ..................... 428/220 |
|---|---|---|---|---|
| 5,278,694 | A | * | 1/1994 | Wheatley et al. ............ 359/359 |
| 5,912,069 | A | * | 6/1999 | Yializis et al. .............. 428/213 |
| 6,045,895 | A | * | 4/2000 | Hyde et al. .................. 428/213 |
| 6,264,747 | B1 | * | 7/2001 | Shaw et al. ................. 118/718 |
| 6,579,601 | B2 | * | 6/2003 | Kollaja et al. .............. 428/212 |

* cited by examiner

*Primary Examiner*—B. Hamilton Hess
*Assistant Examiner*—Lawrence D. Ferguson
(74) *Attorney, Agent, or Firm*—Stamatios Mylonakis

(57) ABSTRACT

A new class of composite polymer films where the refractive index can be varied by simple compressive or extensive forces. The films are comprised of alternating layers of an elastomer and a glassy polymer or two different elastomers. When the layer spacing is much less than the wavelength of the probe light, these materials behave as effective medium composites. The layer thickness of the elastomer component and thus the effective index of the composite can be varied by compression, tension or shear.

20 Claims, 12 Drawing Sheets

VARIABLE REFRACTIVE INDEX POLYMER MATERIALS

This Application claims priority on Provisional Application Ser. No. 60/466,058 filed Apr. 29, 2003, which is incorporated herein by reference in its entirety.

BACKGROUND OF THE INVENTION

1. Field of the Invention

The invention relates to composite polymer films where the refractive index can be varied by simple compressive or extension forces.

2. Description of the Related Art

Extrusion process to produce polymeric photonic materials in the form of flexible sheets with large surface areas is known. This process gives a material comprising many thousands of alternating layers of polymers, polymer composites, and/or polymers containing inorganic or metallic nanoparticles. The polymer materials in the alternating layers can be chosen to have substantial differences in the index of refraction (n) so that the resulting materials will possess a modulation in the index with a period corresponding to the layer thickness.

Multilayer extrusion of polymers with hundreds of layers is known. The methods of fabricating dielectric reflectors and filters with specific transmission properties and pass bands are known. Properly oriented layered birefringence polymers can give multilayer mirrors that maintain reflectivity over a broad band of incident angles. Generally, the multilayer polymers have been fabricated using glassy polymers. Elastomeric multilayer with layer spacings suitable for dielectric filters and reflectors have been fabricated by sequential spin coating and by multilayer extrusion.

The fabrication of elastomeric multilayer structures with layer spacings much less than the wavelength of visible or near infrared (NIR) light has never been reported. It has not been recognized that such a composite will behave as a dynamically variable refractive index.

SUMMARY OF THE INVENTION

This invention, is directed to identifying and fabricating these materials and to demonstrate that they provide a class of materials with a refractive index that can be varied reversibly by modest tensile, compressive or shear forces.

DESCRIPTION OF THE PREFERRED EMBODIMENTS

Figure 1:
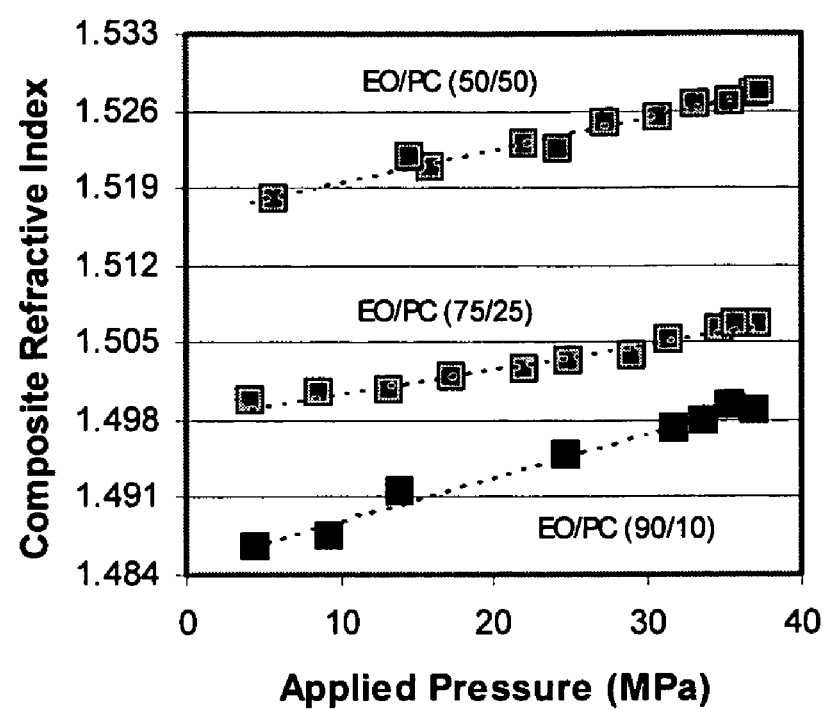
FIG. 1 shows reversible refractive index variation as a function of applied pressure in 50%, 75% and 90% elastomeric films. All films are layered poly(ethylene-octene) (EO) and PC.

A nanolayered composite polymer structure is described that possesses a dynamically variable refractive index. Such materials may have a number of uses including variable focal length lenses and films that switch, attenuate, shutter, filter, or phase shift optical signals in fiber optic and optical waveguide devices.

The nanolayered composite polymer structure of interest comprises alternating layers of different polymers chosen to have differences in the index of refraction (n) and in the elastic moduli. The materials are fabricated with a layer thickness, d, less than one quarter of the wavelength of interest, $\lambda$. For a typical polymer, the wavelengths of interest are between 4 µm and 200 µm or more, preferably between 2.5 µm and 400 µm. For use in the visible region of the spectrum, between 400 µm and 700 µm, the average layer thickness should be less than 100 nm. For use in the infrared (IR) region, between 1 µm and 2.5 µm the average layer thickness should be less than 400 nm. Since the average layer thickness is less than $\lambda$/4n, the optical properties of these new layered structures are those of an effective medium composite. The materials will have a refractive index corresponding to a thickness-weighted average of the refractive indices of the component polymers. Our postulate was that the different elastic moduli of the polymers would make it possible to differentially vary the relative thickness of the component layers by compressing the polymer. This makes a material with a variable effective refractive index possible.

A continuous multilayer co-extrusion process is used to fabricate the polymer composites. This process has been used in the past to produce polymeric photonic materials containing many thousands of alternating layers of polymers, polymer composites, and/or polymers containing inorganic or metallic nanoparticles materials. The layered materials are formed as flexible sheets with large surface areas. The present layered polymers differ from most of the previously reported multilayer polymer films in both the choice of elastomeric polymers for alternate layers and the smaller layer thickness used. Previous layered optical polymers were designed to be used as mirrors, filters, and linear and nonlinear photonic crystals hence the layer thickness, d, was typically that of a quarter wave stack: d~$\lambda$/4n.

In accordance with the present invention the optical properties of layered composite polymer structures comprised of alternating layers of the elastomer, poly(ethylene-octene) (EO), and the glassy polymer, polycarbonate (PC) are discussed. These components were chosen because polycarbonate possesses both a higher refractive index and a much higher compressive modulus than the elastomeric EO polymer. The layer thickness of the layered polymers ranged from 10 nm to 220 nm. It was always less than one-quarter wavelength near 1.546 μm where the refractive index was measured.

Materials

One of ordinary skill in the art will readily appreciate that a wide variety of materials can be used to form the multilayer structure of the present invention. The components comprising the different layers of the multilayer structure are polymeric materials chosen to have a difference in the index of refraction of the layers as large as feasible, preferably between 0.3 and 4, more preferably in the order of from 0.05 to 1, most preferably between 0.1 and 1, including any increments within those ranges. The degree of index difference is chosen to provide the desired variability in the refractive index of the composite. The component polymers preferably, must also possess a difference in the appropriate modulus. The ratio of the modulus of the more rigid material to that of the elastomer is preferably in the range of 2 to $10^5$ or larger. To fabricate a material with a reversibly variable index in tension, a ratio between 2 and 10 is more preferable. For composites whose index varies in compression, a ratio in the range of 2 to $10^5$ or larger is appropriate. The more rigid material can be glassy.

Suitable glassy polymeric materials in accordance with the present invention include but are not limited to, polyethylene naphthalate and isomers thereof such as 2,6-, 1,4-, 1,5-, 2,7-, and 2,3-polyethylene naphthalate; polyalkylene terephthalates such as polyethylene terephthalate, polybutylene terephthalate, and poly-1,4-cyclohexanedimethylene terephthalate; polyimides such as polyacrylic imides; polyetherimides; styrenic polymers such as atactic, isotactic and syndiotactic polystyrene, α-methyl-polystyrene, para-methyl-polystyrene; polycarbonates such as bisphenol-A-polycarbonate (PC); poly(meth)acrylates such as poly(isobutyl methacrylate), poly(propyl methacrylate), poly(ethyl methacrylate), poly(methyl methacrylate), poly(butyl acrylate) and poly(methyl acrylate) (the term "(meth)acrylate" is used herein to denote acrylate or methacrylate); cellulose derivatives such as ethyl cellulose, cellulose acetate, cellulose propionate, cellulose acetate butyrate, and cellulose nitrate; polyalkylene polymers such as polyethylene, polypropylene, polybutylene, polyisobutylene, and poly(4-methyl)pentene; fluorinated polymers such as perfluoroalkoxy resins, polytetrafluoroethylene, fluorinated ethylene-propylene copolymers, polyvinylidene fluoride, and polychlorotrifluoroethylene; chlorinated polymers such as polydichlorostyrene, polyvinylidene chloride and polyvinylchloride; polysulfones; polyethersulfones; polyacrylonitrile; polyamides; polyvinylacetate; polyether-amides. Also suitable are copolymers such as styrene-acrylonitrile copolymer (SAN), preferably containing between 10 and 50 wt %, more preferably between 20 and 40 wt %, acrylonitrile, styrene-ethylene copolymer; and poly(ethylene-1,4-cyclohexylene-dimethylene terephthalate) (PETG). In addition, each individual layer may include blends of two or more of the above-described polymers or copolymers. Preferred polymeric materials include a styrene-acrylonitrile copolymer and a polycarbonate.

Suitable elastomeric materials include, but are not limited to, poly(ethylene-octene) (EO); acrylic rubber (AR); brominated isobutylene-isoprene; butadiene rubber; butadiene-styrene-vinyl pyridine; butyl rubber; chlorinated isobutylene-isoprene; chlorinated polyethylenes; chloroprene (CR); chlorosulfonated polyethylene; epichlorohydrin rubber, homopolymer and copolymer with ethylene oxide; ethylene-propylene-diene (EPDE); ethylene-propylene rubber (EPM); fluorocarbon rubbers; natural rubber (NR); nitrile rubber (NBR); polyisoprene (IR); polysulfide rubber; silicone rubber; styrene-butadiene (SBR); urethane rubber; and blends and formulated rubbers thereof. The above terms for the elastomers are those recognized in the art and are discussed, for instance, in "*Elastomers, desk-top data bank*", Edition 2, The International Plastics Selector, Inc, (1980), which is incorporated herein by reference.

Fabrication

The variable refractive index device of the present invention is then fabricated using these materials in a multilayer extrusion technique. The method preferably yields a flexible large film or sheet of multilayer nonlinear dielectric optical structure. The thickness of the individual layers must be less than λ/4 for the wavelength of light to be used. For example, for a material useful near λ=2.8 μm, a layer thickness on the order of from 5 nanometers to 650 nanometers, preferably from 10 nanometers to 500 nanometers, more preferably from 20 nanometers to 400 nanometers would be used. For operation at shorter wavelengths, the upper limit to the suitable layer thickness must be reduced accordingly. The term "about" is used in the present application to denote a deviation from the stated value. Preferably, the polymeric materials used in the alternating layers are transparent. Preferably, the layers have substantially uniform layer thickness, where "substantially" is used to denote a deviation within 20%. The layer thickness variability should be small enough so that all of the layers have a thickness less than λ/4.

For simplicity of discussion, the behavior of a two-component system is described. In this embodiment of the present invention the multilayer structure is made of two alternating layers (ABABA . . . ) of two polymeric materials referred to as component "(a)" and component "(b)", respectively, throughout the description. Components (a) is a glassy, or higher modulus polymer, while component (b) is an elastomer with a lower modulus; they form a multilayer structure represented by formula $(AB)_x$, where $x=(_2)^n$, and n is the number of multiplier elements. It should be understood that the multilayer structure of the invention may include additional types of layers. For instance, a three component structure of alternating layers (ABCABCA . . . ) of components (a), (b) and (c) is represented by $(ABC)_x$, where x is as defined above.

In a preferred embodiment of the two-component system described above one of the alternating layers (A) comprises component (a) which is a polymeric material of a glassy polymer and a second alternating layer (B) comprises component (b) which is an elastomer. In another preferred embodiment of the two-component system described above one of the alternating layers (A) comprises component (a) which is an elastomer (i) and a second alternating layer (B) comprises component (b) which is an elastomer (ii); by way of a non limiting example, elastomer (i) is a polyurethane elastomer (PU) while elastomer (ii) is PEBAX, an elastomer available from ATOFINA. It is desirable to adjust the composition so that the difference between the linear index of one layer is larger than the linear index of the elastomer by an amount larger than the desired variability of the index.

This is typically 0.05 to 0.25, but it is preferably larger and can be as much as 1. The multilayer structure in the above embodiment is represented by formula $(AB)_x$, where $x=(2)^n$, and n is the number of multiplier elements.

Figure 11:
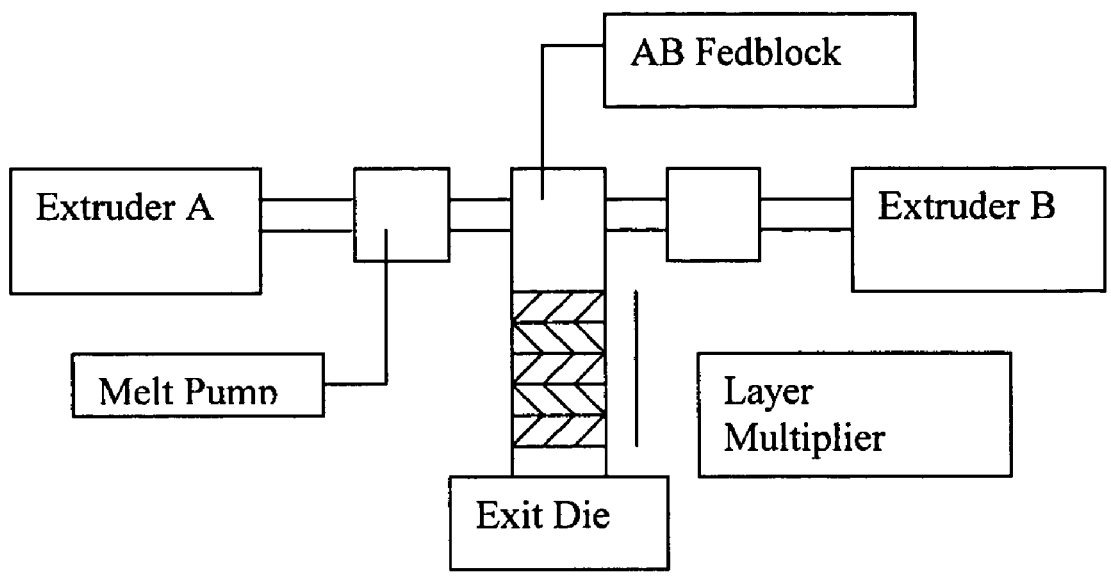
FIG. 11 is a schematic representation of an arrangement for coextrusion of two components (a) and (b) to form a multilayer structure of alternating layers (A) and (B), in accordance with the invention.

In the embodiment described above of a two-component multilayer structure, the variable refractive index polymer material is prepared by microlayer coextrusion of the two polymeric materials. Nanolayers are comprised of alternating layers of two or more components with individual layer thickness ranging from the microscale to the nanoscale. A typical multilayer coextrusion apparatus is illustrated in FIG. 11. The two component (AB) coextrusion system consists of two ¾ inch single screw extruders each connected by a melt pump to a coextrusion feed block. The feed block for this two component system combines polymeric material (a) and polymeric material (b) in an (AB) layer configuration. The melt pumps control the two melt streams that are combined in the feed block as two parallel layers. By adjusting the melt pump speed, the relative layer thickness, that is, the ratio of A to B, can be varied. From the feed block, the melt goes through a series of multiplying elements. A multiplying element first slices the AB structure vertically, and subsequently spreads the melt horizontally. The flowing streams recombine, doubling the number of layers. An assembly of n multiplier elements produces an extrudate with the layer sequence $(AB)_x$ where x is equal to $(2)^n$ and n is the number of multiplying elements. It is understood by those skilled in the art that the number of extruders used to fabricate the structure of the invention equals the number of components. Thus, a three-component multilayer (ABC . . . ), requires three extruders.

Figure 12:
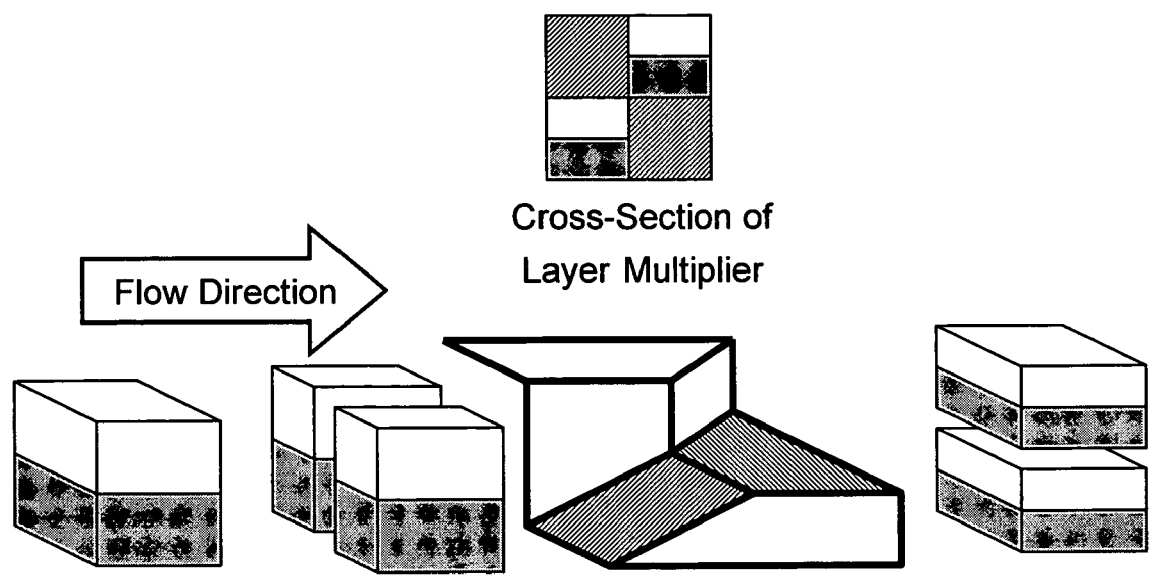
FIG. 12 is a schematic representation of the cutting, stacking and spreading processes that take place in a layer multiplier in the two-component microlayer coextrusion process.

The multilayer structure of the present invention preferably has at least 30 layers, including any number of layers within that range. Preferably, the multilayer structure of the present invention has from 30 to 10000 layers and any number of layers within this range. Preferably, the multilayer structure is in the form of film or sheet. By altering the relative flow rates or the number of layers, while keeping the film or sheet thickness constant, the individual layer thickness can be controlled. The multilayer structure film or sheet has an overall thickness ranging from 0.1 mil to 1000 mils, preferably from 0.1 mils to 125 mils and any increments therein. Further, the multilayer structures may be formed into a number of articles. The structures may be formed by coextrusion techniques initially into films or sheets which may then be post formed. Such post forming operations may include thermoforming, vacuum forming, or pressure forming. Further, through the use of forming dies, the multilayer structures may be formed into a variety of useful shapes In another embodiment of the invention, a third polymeric layer is placed in the multilayer structure as a tie layer, barrier layer or toughening layer. A third component exhibits improved properties such as mechanical properties. Thus, a three component multilayer structure expands the utility of the two component nanolayer structure. When the third polymer layer is a barrier layer, it is present as a single layer on one or both exterior major surfaces of the structure or as an interior layer. For example, suitable barrier layer materials such as hydrolyzed ethylene vinyl acetate, copolymers of polyvinylidene chloride, nitrile polymers, and nylons may be used in or on the multilayer body. Suitable adhesive materials such as maleic anhydride grafted polyolefins may be used to bond such barrier layer materials to the multilayer structure. Alternatively, a third polymeric layer may be used as a surface or skin layer on one or both major exterior surfaces. The skin layer may serve as scratch resistant, weatherable protective layer, as sacrificial layer or as decorative layer. Further, such skin layers may be post applied to the structure after coextrusion. A typical three component system according to the above embodiment is illustrated in FIG. 12. A tie layer (T) is inserted between layer (A) and layer (B) by using a five layer feed block. The five layer melt is sliced, then spread and recombined to give a layer sequence $(ATBT)_xA$, where x is equal to $(2)^n$ for an assembly of n multiplier elements. The additional polymeric layer may be a barrier layer Variation in the Refractive index in tension or shear.

Further, in accordance with the present invention, a class of optical polymers with a nanoscale hierarchical structure exhibits a dynamically variable refractive index. The ability to produce these novel materials derives from our ability to fabricate layered polymer structures with many thousands of layers and features down to less than 10 nm. Modifications of this proven technique enable the fabrication of polymer material structures with the potential to exhibit a dynamically reversible change in the index of refraction. The fabrication techniques are capable of producing large volumes of these materials easily and economically.

The polymer materials in the alternating layers are preferably chosen to have substantial differences in the index of refraction (n) so that the resulting materials will possess a modulation in the index with a period corresponding to the layer thickness. We have used this fabrication technique to produce materials with a layer thickness from many microns to as small as 10 nm and a resulting modulation in the refractive index on the same scale.

When the layer thickness and thus the period of the modulation in the index are shorter than the wavelength of light of interest, the optical properties of the material are that of an effective medium composite. The refractive index and transmission are an average of those of the component materials.

Figure 8:
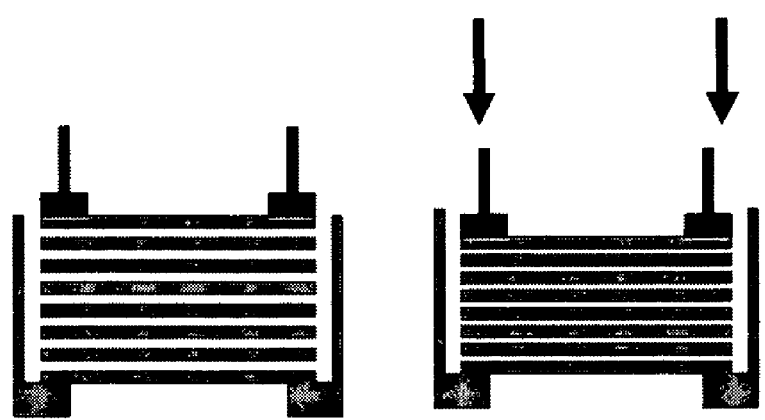
FIG. 8 shows altering the relative layer thickness and hence the index of refraction of a layered by compression
Figure 9:
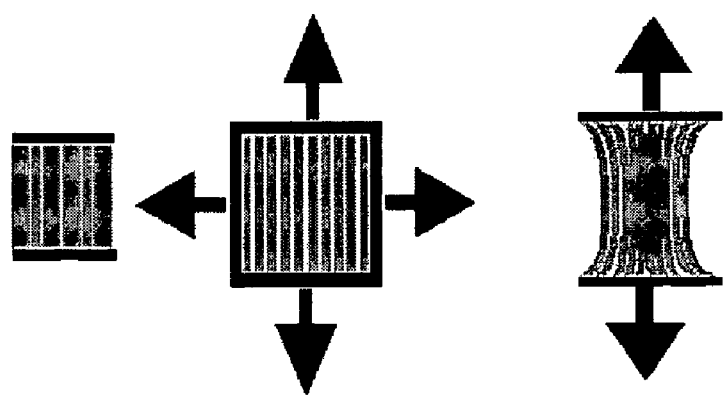
FIG. 9 shows how the layer thickness also can be tuned by tension. The tension can be applied in one or two directions as indicated. It can also be applied radially.
Figure 10:
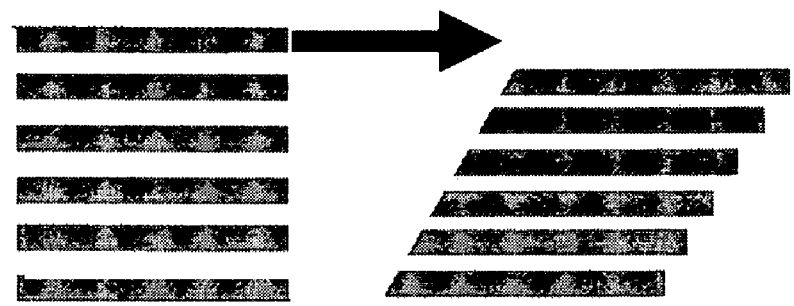
FIG. 10 shows how the layer thickness can be tuned by strain. Strain is particularly useful when one of the layers is quite rigid.

In order to make these materials dynamically tunable, the nanolayered polymers are fabricated with at least one of the layers being an elastomer, i.e. a polymer with a small elastic modulus. As illustrated in FIGS. 8 to 10, elastomeric nanolayered materials enable us to dynamically alter the thickness of either one or both layers by applying compression, tension, or shear forces. If the layers have different elastic moduli, then compression, tension, or shear forces can cause the thickness of the elastomeric layer, the layer with a smaller elastic modulus, to change more than that of the rigid layer. The polymers are chosen so that the refractive index of the layers differs, so a change in the relative path of the layers will dynamically alter the effective refractive index of the layered material.

The refractive index change occurs because the materials are effective media. The magnitude of the index variation possible in a nanolayered material is determined by the index difference and modulus difference between the component layers.

EXAMPLES

A series of multilayer films consisting of 1024 alternating layers of EO and PC were fabricated. In the composite polymers studied here, the sum of the average layer thickness of the EO and PC layers combined was approximately 240 nm, but the relative thickness varied. The first, EO/PC (50/50), had PC and EO layers of equal thickness. Other samples had thickness ratios of 3:1 (EO/PC (75/25)) and 9:1 (EO/PC (90/10)). The layer structure of the 50/50 material was confirmed by AFM studies. The AFM studies showed there was a distribution of layer thickness about the mean thickness.

The refractive index of the three composites was measured using a modified prism coupling instrument (Metricon). Pressure was applied to the film uniformly over an area of 0.78 mm$^2$ by an air driven piston. The applied pressure was measured using a calibrated force sensor (Flexiforce). The refractive index at 1546 nm as a function of applied pressure for the three different multilayer structures is shown in FIG. 1. In each of the layered polymer materials in FIG. 1, the effective refractive index of the composite polymer film varies with the applied pressure. The data in FIG. 1 was recorded with both increasing and decreasing applied pressure. The observed variation in the refractive index is reversible and reproducible. The multilayer film with 90% elastomer exhibits the greatest index change as the applied pressure is increased. At approximately 40 MPa, the observed index change is about 16% of the index difference between the component polymers. At the same applied pressure, the refractive index change for both the 75/25, and 50/50 films were similar, about 11% of the index difference between the component polymers.

In order to verify that the observed refractive index change is a result of the composite structure, the refractive index of samples of pure EO and pure PC were measured under the same experimental conditions. Pure PC showed less than a 0.0002 refractive index variation at the maximum experimental applied pressure. This is within the experimental resolution of the measurement. The compressive modulus of PC is too large for any significant compression to occur. For pure EO, a refractive index change of 0.0012 was observed over the same applied pressure range. This is an order of magnitude smaller change than was observed in FIG. 1 for the composite. The small variation in the index of bulk EO can be ascribed to the compressibility of the EO polymer. A slight decrease in volume would give rise to a concomitant increase in the density with increasing pressure. We can estimate the volume change from the refractive index change by assuming the molar polarization is constant. The observed increase in index corresponds to a Poisson's ratio of 0.499 for the pure EO. We conclude that the layered composite shows at least an order of magnitude larger index change with applied pressure than either component alone.

In order to clarify the mechanism of the index change in the composite, we also studied the variation in layer thickness with applied pressure. The films used for the refractive index measurements at 1546 nm are approximate quarter wave stacks for shorter wavelengths. The dependence of the layer thickness on applied pressure is found from the pressure dependence of the reflectivity at wavelengths where the layered materials behave as dielectric reflectors. Reflectivity occurs at a wavelength, λ, where:

$$\lambda = 2(n_1 d_1 + n_2 d_2) \quad (1)$$

Figure 2:
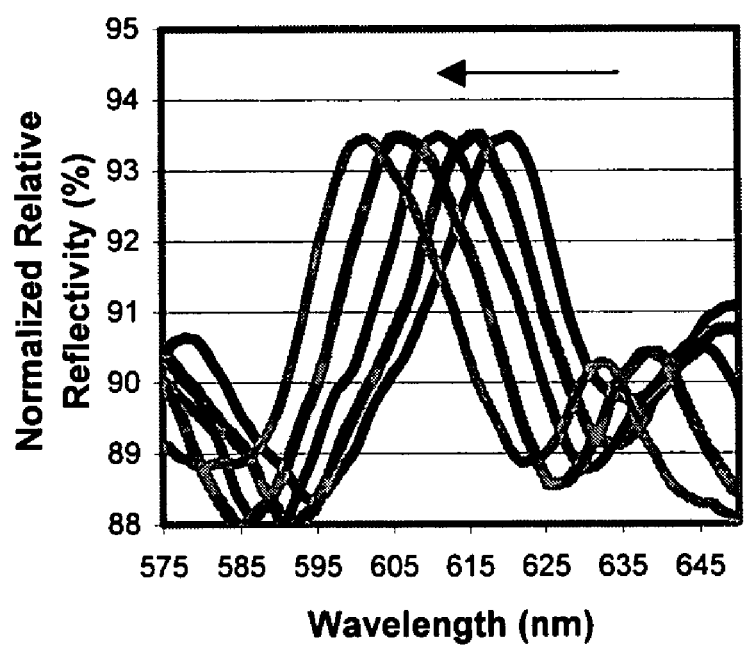
FIG. 2 shows reflectance spectra of EO/PC (50/50) multilayer film. Reflectance maxima shift to blue as pressure is applied perpendicular to the layers.

Here λ is the first order reflected wavelength, $n_1$ and $n_2$ are the refractive index of polymers 1 and 2 and $d_1$ and $d_2$ are the layer thickness of the respective polymer layers. Reflection spectra were observed for both the 50/50 and 75/25 composite materials. They consisted of a set of discrete lines. Such a structured reflection spectrum is expected for a layered dielectric with some disorder. The observed spectra were consistent with about ±10 to 15% variation in the layer thickness. The pressure dependence of reflection peaks near 600 nm was studied. Each of the reflection peaks was observed to shift with applied pressure. FIG. 2 depicts the change in the one of the reflection peaks as pressure is applied perpendicular to the plane of layers for the EO/PC (50/50) composite material. The observed reflection peaks shift reversibly to shorter wavelengths as the pressure is increased providing direct evidence for a pressure dependent decrease in optical layer thickness.

Figure 3:
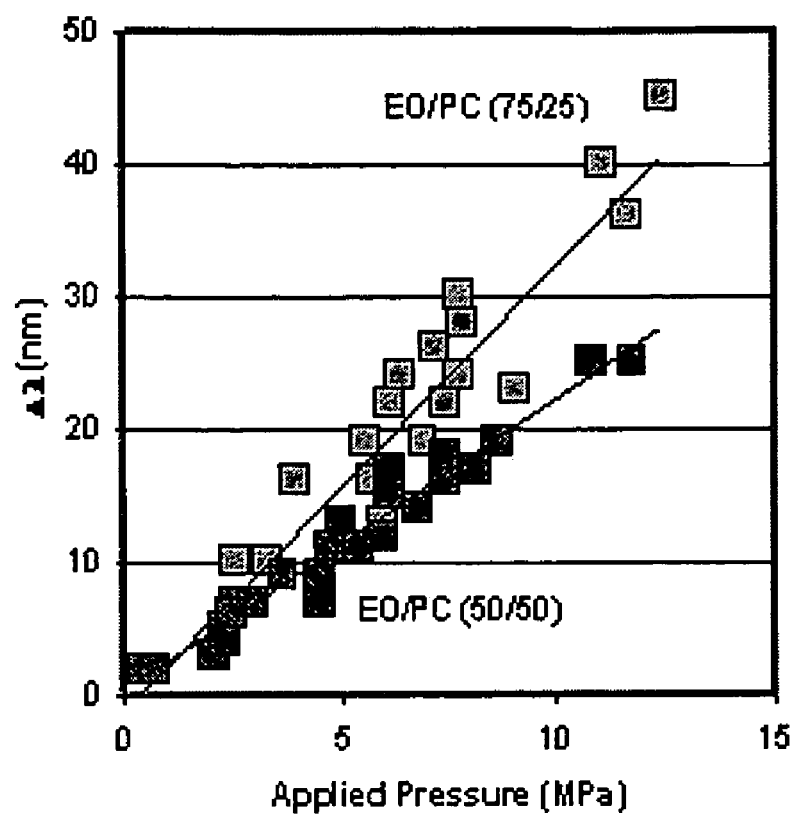
FIG. 3 shows comparative plots of change in reflectance maxima, $\Delta\lambda$, as a function of pressure. A slope of 3.3 and 2.2 nm/MPa were found for the 75/25 and the 50/50 EO/PC films, respectively.

FIG. 3 depicts data collected for the observed wavelength shift, Δλ, as a function of pressure for several different samples of both the 75/25 and the 50/50 EO/PC materials. As pressure is increased, the reflectance maximum decreases linearly and reversibly. Assuming that the only the elastomeric layer is compressed, from equation 1 and the definition of strain, $\sigma = l_2/l_{20}$, the effective compressive modulus of the elastomer in the layered structure, E, can be determined from:

$$\lambda - \lambda_0 = 2 n_2 l_{20} \frac{\sigma}{E} \quad (2)$$

Where $\lambda - \lambda_0 = \Delta\lambda$, $n_2$ is the refractive index of EO near 600 μm (1.4833) and $l_{20}$ is the initial EO layer thickness. The implied compressive modulus for both the 75% and 50% EO films were approximately 160 MPa. This is considerably higher than the measured bulk EO 1% modulus, which was measured to be 19 MPa. We did not observe reflection spectra from the 90/10 EO/PC sample, probably because the reflectivity of this composition was too small.

Figure 4:
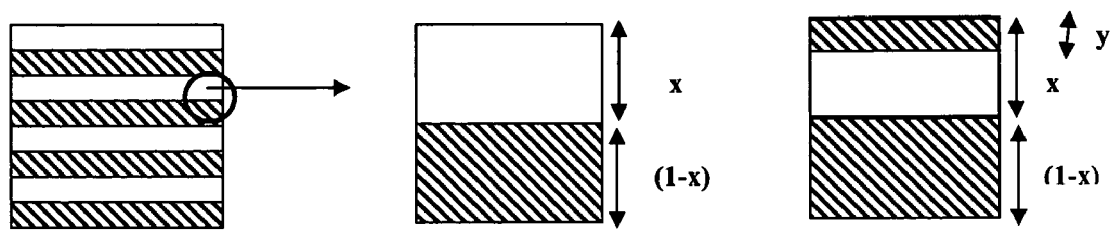
FIG. 4 is a schematic of the compression of the elastomeric layer in the multilayer composite. The labels indicate the variables used in modeling the data. The hatched box represents the higher modulus of glassy material

The expected change in refractive index at 1546 nm for the composite films as a function of applied pressure due to the change in layer thickness can be estimated. The parameters are summarized in FIG. 4. If the index of the rigid layer is $n_1$ and that of the elastomer is $n_2$, then using the appropriate effective medium theory, the index, n, of the composite is:

$$n = \frac{n_1(1-x) + n_2(x-y)}{(1-y)} \quad (3)$$

x is the fractional thickness of the elastomer layers in the initial, uncompressed, state. (1−x) is the thickness of the rigid layers. Under applied stress, the elastomer layer is compressed by an amount y. The strain on the elastomer layer is $\epsilon = y/x$. Utilizing the definitions $y = \epsilon x$ and $\epsilon = (\sigma/E)$ and defining the index at zero strain, $n_0 = n_1(1-x) + n_2 x$, we can calculate the refractive index of the layered composite as a function of applied stress, σ, and the effective modulus of the elastomer layer, E:

$$n = \frac{n_0 - n_2 x \left(\frac{\sigma}{E}\right)}{\left(1 - x\left(\frac{\sigma}{E}\right)\right)} \quad (4)$$

Figure 5:
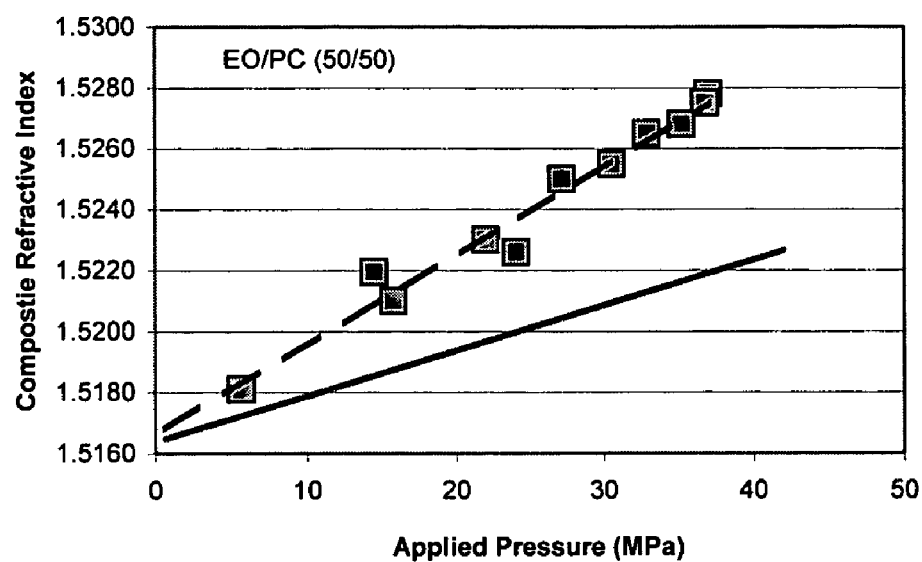
FIG. 5 shows experimental and calculated composite refractive indices as a function of applied pressure for EO/PC (50/50).
Figure 6:
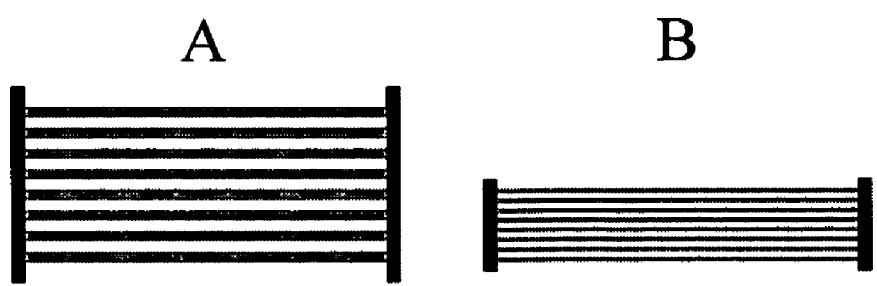
FIG. 6 represents a comparison A) Layer thickness~$\lambda$/4n: dielectric filters and mirrors. B) Layer thickness less than $\lambda$/4n. layered composite
Figure 7:
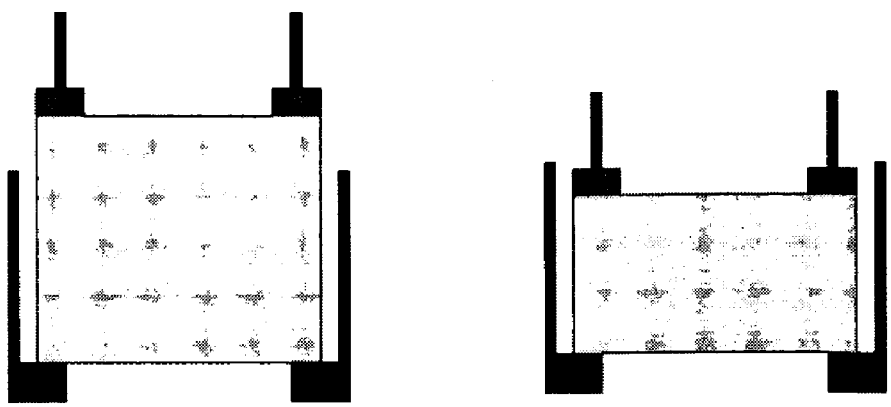
FIG. 7 shows how altering the relative layer thickness changes the index of the layered composite

Using the modulus determined from the reflectivity data, and x determined from the measured index at zero pressure. The solid line in FIG. 5 is a plot of the expected indices from equation 3 vs. the pressure. FIG. 5 compares this with the experimental measurements. The changes in EO layer thickness account for only part of the observed index changes in the composite polymer.

Other sources for the observed pressure dependent index of the composite include a pressure dependence of the index of the EO layer. In the bulk, the pressure dependence of the refractive index of EO was about $3\pm1\times10^5$ per MPa. Neglecting it seemed justified. However, if the pressure dependence of the EO index in nanolayers differs from that in the bulk, either because the elastomer is constrained from expanding normal to the applied pressure, or because the interfacial regions contribute differently to the pressure dependence, it could contribute to the pressure dependent index of the composite. The dashed line in FIG. 5 gives the pressure dependence of the composite from equation 4 if the index of the EO layer increases at $3\times10^4$ per MPa, about an order of magnitude larger than in the bulk. A larger pressure dependent index for EO in the nanolayers can account for the observed index variation in the composite.

In summary, we fabricated a layered elastomer/glassy polymer composite with sufficiently thin layers so the material is an effective medium composite at 1546 nm. We demonstrated that the refractive index of such a composite polymer could be varied reversibly by compression. The index varied by as much as 0.013 or about 16% of the index difference between the component polymers with pressures of about 38 MPa. The pressure dependence of the index of the composite was much larger than that of either of the component polymers alone. The observed variation of the index of the composite with pressure was modeled by measuring the EO layer thickness independently. These measurements indicate that both the effective elastic modulus and the pressure dependent index of the EO layer were larger in the nanolayers than in the bulk.

This work illustrates nanolayered elastomer/glassy polymers can have unique and useful optical properties and that optical characterization techniques are useful for studying the mechanical properties of such layered polymers.

The variation in the refractive index with tension was demonstrated qualitatively in multi-layered films. One example was comprised of alternating layers of the high-index glassy polymer, polycarbonate (PC), and the low-index elastomer poly(ethylene-octene) copolymer (EO). It had 1024 layers of EO/PC where the EO layers were 9 times as thick as the Pc layers (90/10) and a total thickness of the film was ~50 µm. The refractive index was observed to change from 1.5079 to 1.5198 for a Δn of 0.012 under an applied tension of approximately 16 MPa. The corresponding observed strain was approximately 60%.

Fabrication

System: 2 component.

Number of Layers: 1024

| Materials | Composition | | |
|---|---|---|---|
| EO/PC | 50/50 | 75/25 | 90/10 |

The poly(ethylene-octene) copolymer having a density of 0.860 is available from Dow/Dupont.

The polycarbonate was CALIBRE 200-14 manufactured by Dow.

Details of multilayer Coextrusion

Extruders

Make—KILLION Extruders Inc.

Size—¾"

L/D ratio—24:1

Melt Pumps

ZENITH Pumps Inc.

Capacity—1.2 cc/hr

Multipliers

Long multipliers were used.

# of multipliers—11

Die

A 3" die was used.

Processing Conditions 1. 50% EO/50% PC

| | Temperature (° C.) |
|---|---|
| Barrel Zone #1 | 230 |
| Barrel Zone #2 | 250 |
| Barrel Zone #3 | 265 |
| Clamp | 265 |
| Adapter | 265 |
| Pump | 265 |
| Multipliers | 220 |
| Exit Die | 240 |

The temperature is adjusted so that the rheologies of the two materials are comporable.

| | Extruder 1 | Extruder 2 |
|---|---|---|
| Screw Speed (rpm) | 25 | 31 |
| Pump Speed (rpm) | 20 | 20 |

2. 75% EO/25% PC

| | Temperature (° C.) |
|---|---|
| Barrel Zone #1 | 220 |
| Barrel Zone #2 | 250 |
| Barrel Zone #3 | 270 |
| Clamp | 270 |
| Adapter | 270 |
| Pump | 270 |
| Multipliers | 210 |
| Exit Die | 220 |

| | Extruder 1 | Extruder 2 |
|---|---|---|
| Screw Speed (rpm) | 27 | 32 |
| Pump Speed (rpm) | 17 | 17 |

90% EO/10% PC

| | Temperature (° C.) |
|---|---|
| Barrel Zone #1 | 208 |
| Barrel Zone #2 | 242 |
| Barrel Zone #3 | 253 |
| Clamp | 253 |
| Adapter | 253 |
| Pump | 253 |
| Multipliers | 190 |
| Exit Die | 200 |

|  | Extruder 1 | Extruder 2 |
| --- | --- | --- |
| Screw Speed (rpm) | 3.5 | 3.8 |
| Pump Speed (rpm) | 7.0 | 7.0+ |

Having generally described this invention, a further understanding can be obtained by reference to certain specific examples which are provided herein for purpose of illustration only and are not intended to be limiting unless otherwise specified.

Obviously, numerous modifications and variations of the present invention are possible in light of the above teachings. It is therefore to be understood that within the scope of the appended claims, the invention may be practiced otherwise than as specifically described herein.

The invention claimed is:

1. A multilayer structure comprising,
a plurality of at least two alternating layers A and B represented by formula $(AB)_x$, where $x=2^n$, and n is in the range of from 4 to 15;
wherein layer A is comprised of component (a) and layer B is comprised of component (b);
said alternating layers are comprised of different polymers exhibiting differences in the index of refraction and in the elastic moduli; wherein said differences in the index of refraction are between 0.05 and 4 units;
wherein the layer thickness of said layer A and B are less than one quarter of the wavelength of interest;
wherein said multilayer polymer structure behaves as an effective medium and wherein said structure exhibits a single refractive index;
wherein said effective medium polymeric materials are transparent; and
wherein the refractive index of said multilayered structure effective medium material can be varied by tensile, compressive or shear force.

2. The multilayer structure of claim 1, wherein component (a) is a glassy polymer and component (b) is an elastomeric polymer.

3. The multilayer structure of claim 1, wherein component (a) is an elastomeric polymer and component (b) is a different elastomeric polymer.

4. The multilayer structure of claim 1, comprising a plurality of at least three alternating layers A, B and C, represented by formula $(ABC)_x$, wherein layer A is comprised of component (a), layer B is comprised of component (b) and layer C is comprised of component (c); and wherein said components (a), (b) and (c) may be the same or different provided that the refractive index of at least one of components (a), (b) or (c) can be varied by tensile, compressive or shear force; and wherein the thickness of each layer is less than one quarter of the wavelength at which the refractive index of the material is measured.

5. The multilayer structure of claim 1, wherein said multilayer structure contains at least 30 layers.

6. The multilayer structure of claim 1, wherein the thickness of each layer is in the order of from 5 nanometers and 650 nanometers; provided that the thickness of each layer is less then one quarter of the wavelength at which the refractive index of the material is measured or the material is used.

7. The multilayer structure of claim 1, which includes a tie layer (T) between layer A and layer B; said multilayer structure represented by formula $(ATBT)_x A$, where $x=2^n$ and n is the number of multiplier elements.

8. The multilayer structure of claim 1, which includes a barrier layer.

9. The multilayer structure of claim 1, which includes a surface layer on at least one major surface thereof.

10. The multilayer structure of claim 1, wherein said multilayer structure is a film or a sheet.

11. The multilayer structure of claim 9, wherein the thickness of said film or sheet is in the range from 0.1 to 1000 mils.

12. The multilayer structure of claim 2, wherein said glassy material is selected from the group consisting of a polyethylene naplithalate, a polyethylene naphthalate isomer, a polyalkylene terephthalate, a polyetherimide, a styrenic polymer, a polycarbonate, a poly(meth)acrylate, a cellulose derivative, a polyalkylene polymer, a fluorinated polymer, a chlorinated polymer, polyvinylacetate, a polyether-amide, a styrene-acrylonitrile copolymer, styrene-ethylene copolymer, poly(ethylene-1,4-cyclohexylenedimethylene terephthalate) and blends thereof.

13. The multilayer structure of claim 12, wherein said polyethylene naphthalate isomer is selected from the group consisting of 2,6-, 1,4-, 1,5-, 2,7-, and 2,3-polyethylene naphthalate; the polyalkylene terephthalate is selected from the group consisting of polyethylene terephthalate, polybutylene terephthalate, and poly-1,4-cyclohexanedimethylene terephthalate; the polyimide is a polyacrylic imide; the styrenic polymer is selected from the group consisting of atactic polystyrene, isotactic polystyrene, syndiotactic polystyrene, α-methyl-polystyrene, and para-methyl-polystyrene; the polycarbonate is bisphenol-A-polycarbonate (PC); the poly(meth)acrylate is selected from the group consisting of poly(isobutyl methacrylate), poly(propyl methacrylate), poly(ethyl methacrylate), poly(methyl methacrylate), poly (butyl acrylate) and poly(methyl acrylate); the cellulose derivative is selected from the group consisting of ethyl cellulose, cellulose acetate, cellulose propionate, cellulose acetate butyrate and cellulose nitrate; the polyalkylene polymer is selected from the group consisting of polyethylene, polypropylene, polybutylene, polyisobutylene and poly(4-methyl)pentene; the fluorinated polymer is selected from the group consisting of perfluoroalkoxy resins, polytetrafluoroethylene, a fluorinated ethylene-propylene copolymer, polyvinylidene fluoride and polychlorotrifluoroethylene; the chlorinated polymer is selected from the group consisting of polydichiorostyrene, polyvinylidene chloride and polyvinylchloride.

14. The multilayer structure of claim 2, wherein said elastomeric polymer is selected from the group consisting of poly(ethylene-octene), acrylic rubber, brominated isobutylene-isoprene, butadiene rubber, butadiene-styrene-vinyl pyridine, butyl rubber, chlorinated isobutylene-isoprene, a chlorinated polyethylene, chloroprene, chlorosulfonated polyethylene, epichlorohydrin rubber, a homopolymer with ethylene oxide, a copolymer with ethylene oxide, ethylene-propylene-diene, ethylene-propylene rubber, a fluorocarbon rubber, natural rubber, nitrile rubber, polyisoprene, polysulfide rubber, silicone rubber, styrene-butadiene, urethane rubber, blends and formulated rubbers thereof.

15. The multilayer structure of claim 8, wherein said barrier is selected from the group consisting of hydrolyzed ethylene vinyl acetate, a copolymer of polyvinylidene chloride, a nitrile polymer, and nylons.

16. The multilayer structure of claim 8, wherein said barrier layer is bonded using an adhesive material.

17. The multilayer structure of claim 16, wherein said adhesive material is a maleic anhydride grafted polyolefin.

18. A method for forming the multilayer structure of claim 1, comprising extruding component (a) in an extruder (A) to form a melt stream (A) and component (b) in an extruder (B) to form a melt stream (B);

combining melt stream (A) with melt stream (B) in a feed block to form parallel layers (A) and (B);

advancing said parallel layers through a series of multiplying elements (n) to form the multilayer structure.

19. The multilayer structure of claim 1, wherein said differences in the index of refraction are from 0.1 to 1.

20. The multilayer structure of claim 1, wherein said differences in the index of refraction are from 0.3 to 1.

* * * * *

UNITED STATES PATENT AND TRADEMARK OFFICE
CERTIFICATE OF CORRECTION

PATENT NO. : 7,255,914 B2 Page 1 of 1
APPLICATION NO. : 10/788480
DATED : August 14, 2007
INVENTOR(S) : Shirk et al.

It is certified that error appears in the above-identified patent and that said Letters Patent is hereby corrected as shown below:

Column 4, line 46, "$x=(_2)^n$" should be: --$x=(2)^n$--;

Column 12, line 3, "polyethylene naplithalate" should be: --polyethylene naphthalate--;

Claim 13, penultimate line, "polydichiorostyrene" should be: --polychlorostyrene--.

Signed and Sealed this

Thirtieth Day of October, 2007

JON W. DUDAS
*Director of the United States Patent and Trademark Office*